(12) United States Patent
Fanshier et al.

(10) Patent No.: US 12,364,186 B2
(45) Date of Patent: Jul. 22, 2025

(54) AGRICULTURAL IMPLEMENTS HAVING ROW UNIT POSITION SENSORS AND A ROTATABLE IMPLEMENT FRAME, AND RELATED CONTROL SYSTEMS AND METHODS

(71) Applicant: AGCO Corporation, Duluth, GA (US)

(72) Inventors: Benjamin Anson Fanshier, Hesston, KS (US); Monte J. Rans, Hesston, KS (US); Ross Duerksen, Hesston, KS (US); Zane Wesley Unrau, Wichita, KS (US); Robert L Figger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 597 days.

(21) Appl. No.: 17/177,460

(22) Filed: Feb. 17, 2021

(65) Prior Publication Data

US 2021/0315148 A1 Oct. 14, 2021

Related U.S. Application Data

(60) Provisional application No. 63/007,163, filed on Apr. 8, 2020.

(51) Int. Cl.
*A01B 63/24* (2006.01)
*A01B 73/04* (2006.01)
(Continued)

(52) U.S. Cl.
CPC .............. *A01C 7/203* (2013.01); *A01B 63/24* (2013.01); *A01C 7/08* (2013.01); *A01B 73/042* (2013.01)

(58) Field of Classification Search
CPC ......... A01C 7/201; A01C 7/203; A01C 7/205; A01C 7/208; A01B 63/00; A01B 63/002;
(Continued)

(56) References Cited

U.S. PATENT DOCUMENTS 4,535,847 A * 8/1985 Hasegawa ............... E02F 3/844
172/446
5,653,292 A * 8/1997 Ptacek .................... A01C 7/203
172/310
(Continued)

FOREIGN PATENT DOCUMENTS

GB 1154811 A 6/1969
WO 2019/157521 A1 8/2019

OTHER PUBLICATIONS

UK Intellectual Property Office, Search Report for related UK Application No. GB2005947.3, dated Oct. 21, 2020.

*Primary Examiner* — Christopher J Sebesta
*Assistant Examiner* — Audrey L Lusk

(57) ABSTRACT

An implement includes an implement frame having an integrated elongate toolbar carrying at least one row unit, at least one wheel coupled to the implement frame and defining an axis of rotation, a sensor configured to sense a position of the at least one row unit relative to the ground, and a control system. The control system is configured to receive a signal related to the sensed position of the at least one row unit relative to the ground and cause a lift system to raise or lower a portion of the implement frame connected to the lift system to rotate the implement frame about the axis of rotation of the at least one wheel based at least in part on the signal. Control systems and related methods are also disclosed.

20 Claims, 7 Drawing Sheets

(51) Int. Cl.
*A01C 7/08* (2006.01)
*A01C 7/20* (2006.01)

(58) Field of Classification Search
CPC ... A01B 63/008; A01B 63/111; A01B 63/114; A01B 63/1112; A01B 63/1115; A01B 63/1117; A01B 63/16; A01B 63/24; A01B 63/28; A01B 63/32; A01B 59/042
See application file for complete search history.

(56) References Cited

U.S. PATENT DOCUMENTS

| | | | | |
|---|---|---|---|---|
| 5,685,245 | A * | 11/1997 | Bassett | A01B 79/005 172/683 |
| 6,076,611 | A * | 6/2000 | Rozendaal | A01B 63/32 172/474 |
| 9,433,142 | B2 * | 9/2016 | Bergen | A01C 7/205 |
| 2003/0127235 | A1 * | 7/2003 | Dannigkeit | A01B 63/32 172/2 |
| 2013/0112124 | A1 * | 5/2013 | Bergen | A01C 5/06 111/151 |
| 2015/0101517 | A1 * | 4/2015 | Borgmann | A01C 9/00 111/24 |
| 2017/0006761 | A1 * | 1/2017 | Anderson | A01B 73/04 |
| 2017/0332543 | A1 * | 11/2017 | Magarity | A01B 73/046 |
| 2017/0359941 | A1 * | 12/2017 | Czapka | A01B 59/042 |
| 2018/0303022 | A1 * | 10/2018 | Barrick | A01B 76/00 |
| 2019/0021211 | A1 * | 1/2019 | Gutknecht | A01B 63/22 |
| 2019/0126912 | A1 | 5/2019 | Peterson et al. | |
| 2019/0327879 | A1 * | 10/2019 | Fanshier | A01B 63/22 |
| 2020/0084951 | A1 * | 3/2020 | Fanshier | A01B 63/102 |

* cited by examiner

AGRICULTURAL IMPLEMENTS HAVING ROW UNIT POSITION SENSORS AND A ROTATABLE IMPLEMENT FRAME, AND RELATED CONTROL SYSTEMS AND METHODS

CROSS-REFERENCE TO RELATED APPLICATION

This application claims the benefit of the filing date of U.S. Provisional Patent Application 63/007,152, "Agricultural Implements Having Row Unit Position Sensors and a Rotatable Implement Frame, and Related Control Systems and Methods," filed Apr. 8, 2020, the entire disclosure of which is incorporated herein by reference.

FIELD

Embodiments of the present disclosure relate generally to machines and methods for working agricultural fields. In particular, embodiments relate to implements (e.g., planters, tillage, etc.) and to methods of controlling such implements.

BACKGROUND

Crop yields are affected by a variety of factors, such as seed placement, soil quality, weather, irrigation, and nutrient applications. Seeds are typically planted in trenches formed by discs or other mechanisms of a planter row unit. Depth of seed placement is important because seeds planted at different depths emerge at different times, resulting in uneven crop growth. Trench depth can be affected by soil type, moisture level, row unit speed, and operation of the opening discs. It would be beneficial to have improved methods of controlling the location of planter row units so that seeds can be more precisely placed in a field.

BRIEF SUMMARY

In some embodiments, an implement includes an implement frame having an integrated elongate toolbar carrying at least one row unit, at least one wheel coupled to the implement frame and defining an axis of rotation, a sensor configured to sense a position of the at least one row unit relative to the ground, and a control system. The control system is configured to receive a signal related to the sensed position of the at least one row unit relative to the ground and cause a lift system to raise or lower a portion of the implement frame connected to the lift system to rotate the implement frame about the axis of rotation of the at least one wheel based at least in part on the signal.

Other embodiments include a control system for an implement having at least one wheel coupled to an implement frame. The implement frame has an integrated elongate toolbar carrying at least one row unit. The control system includes a sensor configured to sense a position of the at least one row unit relative to the ground, and a controller. The controller is configured to receive a signal from the sensor indicating the position of the at least one row unit relative to the ground and cause a lifting system to raise or lower a portion of the implement frame to rotate the implement frame about an axis of rotation of the at least one wheel based on the sensed position of the at least one row unit.

Certain embodiments include a computer-implemented method for operating a tractor and an implement having a frame coupled to the tractor, the frame supported by at least one wheel and having an integrated elongate toolbar carrying at least one row unit. The method includes receiving an indication of a position of the at least one row unit relative to the ground sensed by a sensor, and causing a lift system to raise or lower a portion of the implement frame relative to the tractor to rotate the implement frame about an axis of rotation of the at least one wheel based at least in part on the indication of the position of the at least one row unit.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments when read in conjunction with the accompanying drawings, in which:

DETAILED DESCRIPTION

Figure 1:
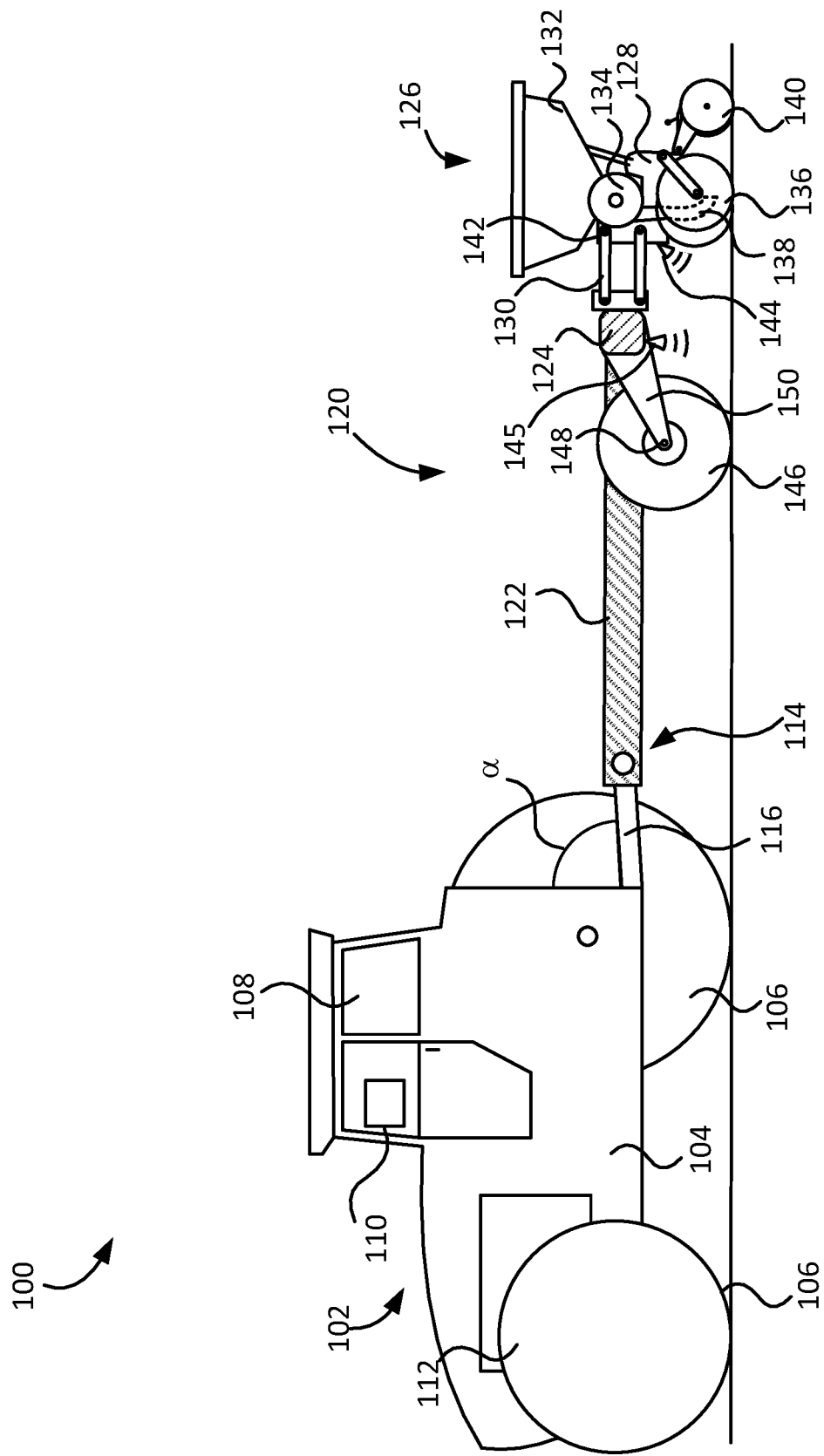
FIG. 1 is a simplified side view of a tractor pulling an implement on level ground in accordance with one embodiment.

The illustrations presented herein are not actual views of any tillage implement or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 is a simplified side view of a system 100 including a tractor 102 and an implement 120. The tractor 102 includes a chassis 104 supported by wheels 106 and/or tracks. An operator cab 108 is typically supported by the chassis 104 and includes a control system 110 that may control operation of the tractor 102 and/or the implement 120. In some embodiments, the operator cab 108 may be omitted if the tractor 102 is configured to function without an onboard human operator (e.g., as a remotely operated drone or a computer-operated machine). The control system 110 may include a central processing unit ("CPU"), memory, and graphical user interface ("GUI") (e.g., a touch-screen interface). A global positioning system ("GPS") receiver may be mounted to the tractor 102 and connected to communicate with the control system 110. The tractor 102 has a power source 112 configured to move the wheels 106, which may include an internal combustion engine, an electric motor, or other source. The power source 112 may also provide power to a lift system 114 carried by the tractor 102, which is depicted as a tow hitch 116. Note that one of the rear wheels 106 has been omitted from view to more clearly show the tow hitch 116. The tow hitch 116 may be a 2-point lifting hitch, as shown. In other embodiments, the implement 120 is pulled by a 3-point lifting hitch or a fixed drawbar. Typically, if the implement 120 is pulled by a 3-point hitch, the top link thereof is not connected to the implement 120. Thus, the implement 120 may pivot with respect to the tow hitch 116. In some embodiments, the lift system 114 may be a part of the implement 120, and thus the implement 120 may be pulled by a fixed drawbar that is stationary relative to the tractor 102. In such embodiments, the implement 120 itself may include a pivoting or lateral adjustment, such as a support coupled to one or more actuators, in place of the hitch 116 shown.

As shown in FIG. 1, the implement 120 has a frame 122 including an integrated toolbar 124 supporting row units 126. The row units 126 may be any type of ground-engaging device for planting, seeding, fertilizing, tilling, or otherwise working crops or soil, typically in rows. As an example, the row unit 126 is shown in the form of a planter row unit. The row unit 126 has a body 128 pivotally connected to the toolbar 124 by a parallel linkage 130, enabling the row unit 126 to move vertically independent of the toolbar 124. In some embodiments, the body 128 of the row unit 126 may be connected to the toolbar 124 by another structure, such as a rotating arm. The body 128 may be a unitary member, or may include one or more members coupled together (e.g., by bolts, welds, etc.). The body 128 operably supports one or more hoppers 132, a seed meter 134, a seed delivery mechanism 136, a seed trench opening assembly 138, a trench closing assembly 140, and any other components as known in the art. It should be understood that the row unit 126 shown in FIG. 1 may optionally be a part of a central fill planter, in which case the hoppers 132 may be one or more mini-hoppers fed by a central hopper carried by the implement 120.

The implement 120 is supported by at least one wheel 146 coupled to the implement frame 122. The wheel 146 rotates about an axle 148 connected to the frame 122 by a fixed mount 150. The axle 148 defines an axis of rotation around which the wheel 146 rotates. A weight of the implement frame 122 is supported by the wheel 146. Though only one wheel 146 is shown in FIG. 1, multiple wheels 146 (e.g., two wheels, three wheels, four wheels, etc.) may support the weight of the implement frame 146.

At least one sensor 142 and/or 144 may be used to determine a position of a row unit 126 relative to the ground. In some embodiments, sensor(s) 142, 144 may be carried on the body 128 of the row unit 126 itself. In other embodiments, the sensor may be carried by the toolbar 124, the tractor 102, or even by another vehicle (e.g., another ground vehicle, an unmanned aerial vehicle, etc.). The sensor 142 may be a rotary sensor configured to measure an angle of an element of the parallel linkage 130 relative to the body 128 of the row unit 126 or to the toolbar 124, and may be connected to a pivot point of the body 128 of the row unit 126 or to the toolbar 124. In some embodiments, an additional sensor 145 may be configured to detect the position of the toolbar 104 relative to the ground. The sensor(s) 144, 145 depicted may include a non-contact depth sensor, for example, an optical sensor, an ultrasonic transducer, an RF (radio frequency) sensor, lidar, radar, etc. Such sensors are described in, for example, U.S. Patent Application Publication 2019/0075710, "Seed Trench Depth Detection Systems," published Mar. 14, 2019.

The sensor(s) 142, 144, 145 may provide information to the control system 110, which information can be used by the control system 110 to determine how to adjust the lift system 114. That is, the control system 110 is configured to receive a signal (e.g., a wired or wireless signal) related to the position of the row unit 126 relative to the ground and cause the lift system 114 to raise or lower based at least in part on the signal.

Vertical movement of the lift system 114 causes rotation of the frame 122 about the axle 148. If the lift system 114 is a 3-point or 2-point lifting hitch 116 as shown in FIG. 1, the lift system 114 may be used to raise or lower the toolbar 124 by changing an angle α of the frame 122 relative to the ground. The lift system 114 may be configured such that upward movement of the front of the frame 122 can cause downward movement of the toolbar 124 because the toolbar 124 is fixed relative to the frame 122.

Figure 2:
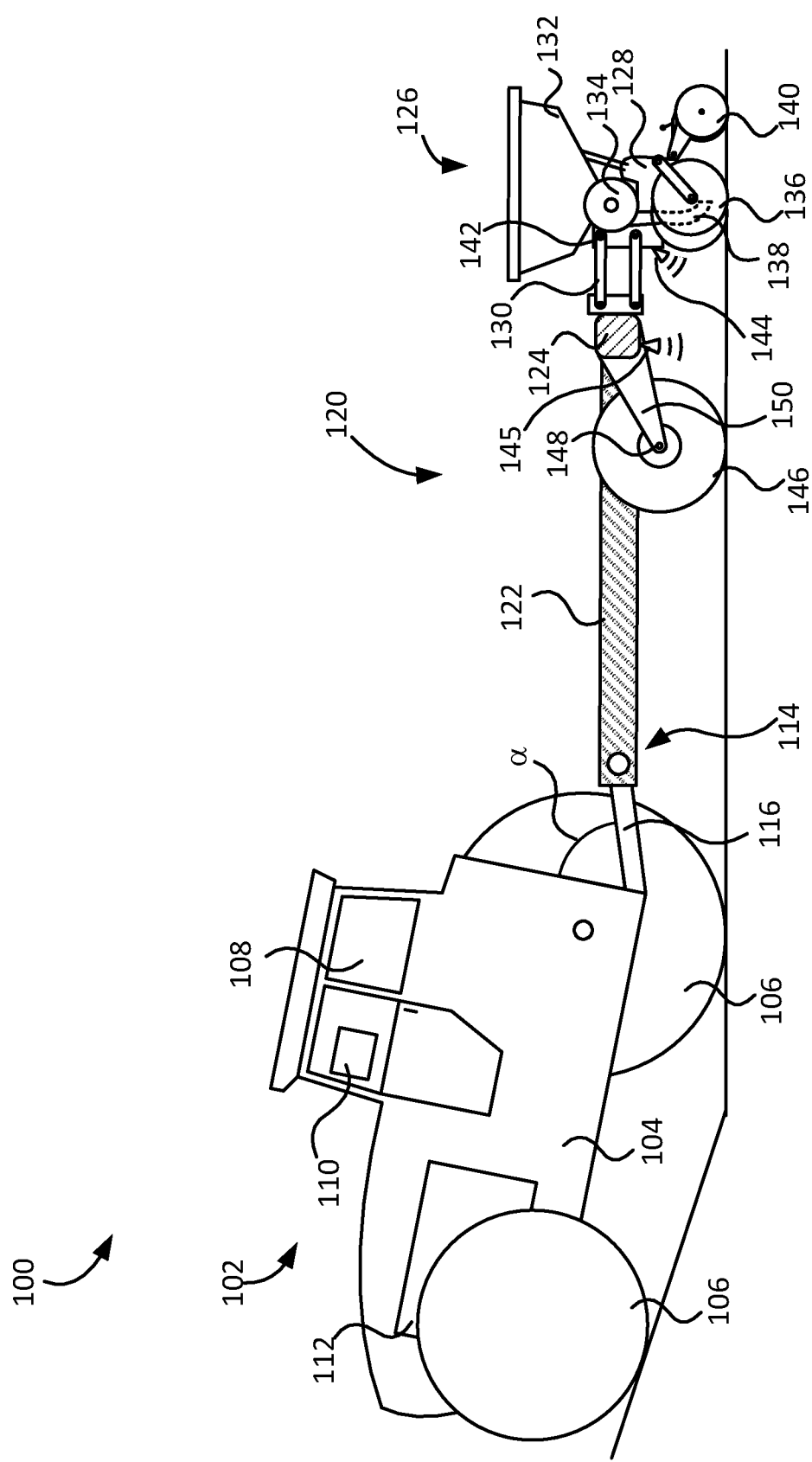
FIGS. 2 through 5 are simplified side views of the tractor and implement shown in FIG. 1, in various positions on sloped ground.
Figure 3:
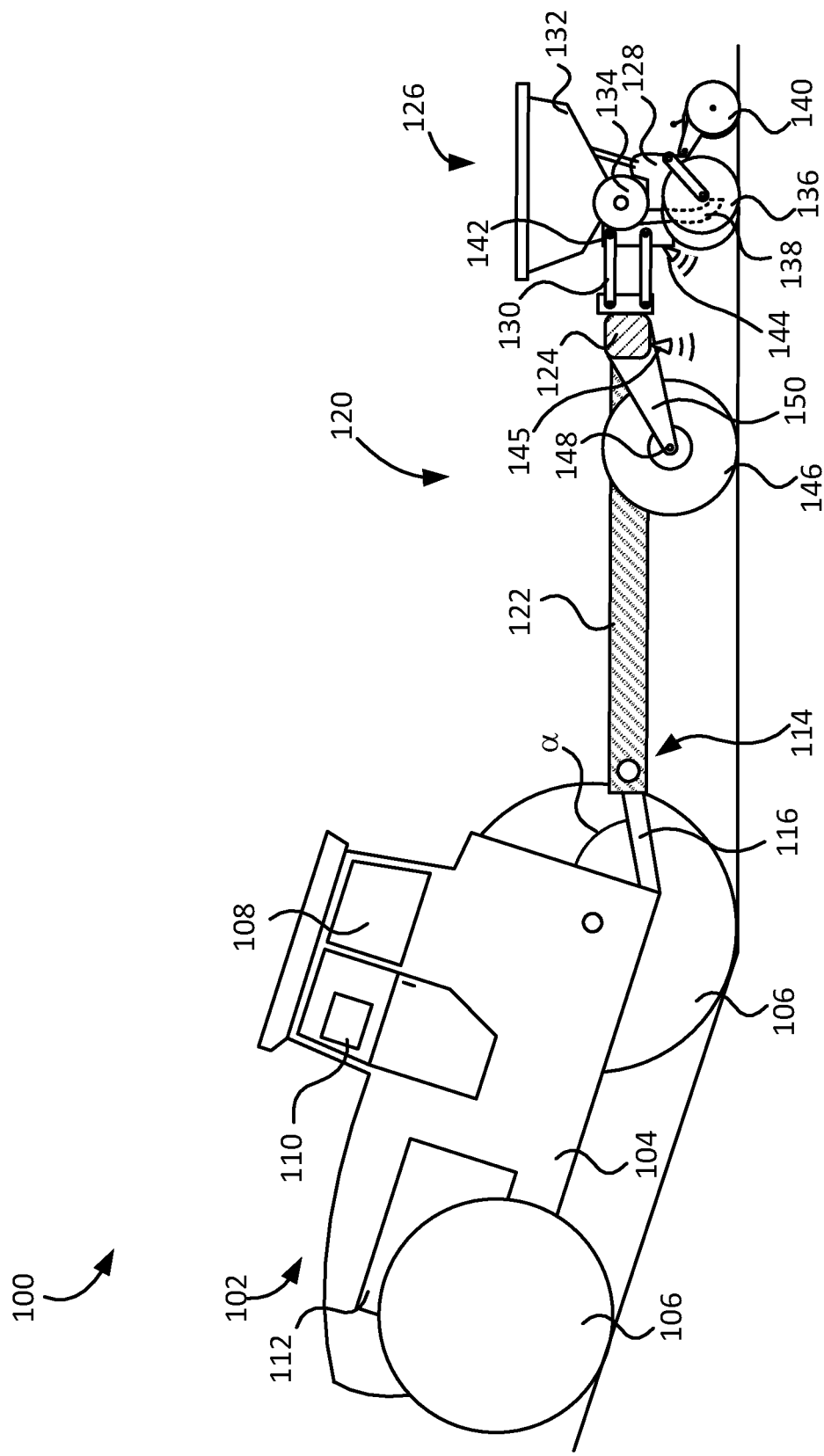

As depicted in FIGS. 2 through 5, when the tractor 102 encounters a change in field elevation and/or slope, the sensor(s) 142, 144, 145 may provide a signal to the control system 110, and the control system 110 may use that signal to calculate how to change the position of the lift system 114 to maintain a preselected position of the toolbar 124 and/or the row unit 126. For example, and as shown in FIGS. 2 and 3, when the front wheels 106 of the tractor 102 travel up a slope, the tractor 102 tilts upward, and points on the tractor 102 behind its rear axle become closer to the ground. However, because the implement 120 is still on level ground, the lift system 114 raises (corresponding to a smaller angle α) relative to the tractor 102 to keep the frame 122 oriented such that the row unit 126 can engage the ground.

Figure 4:
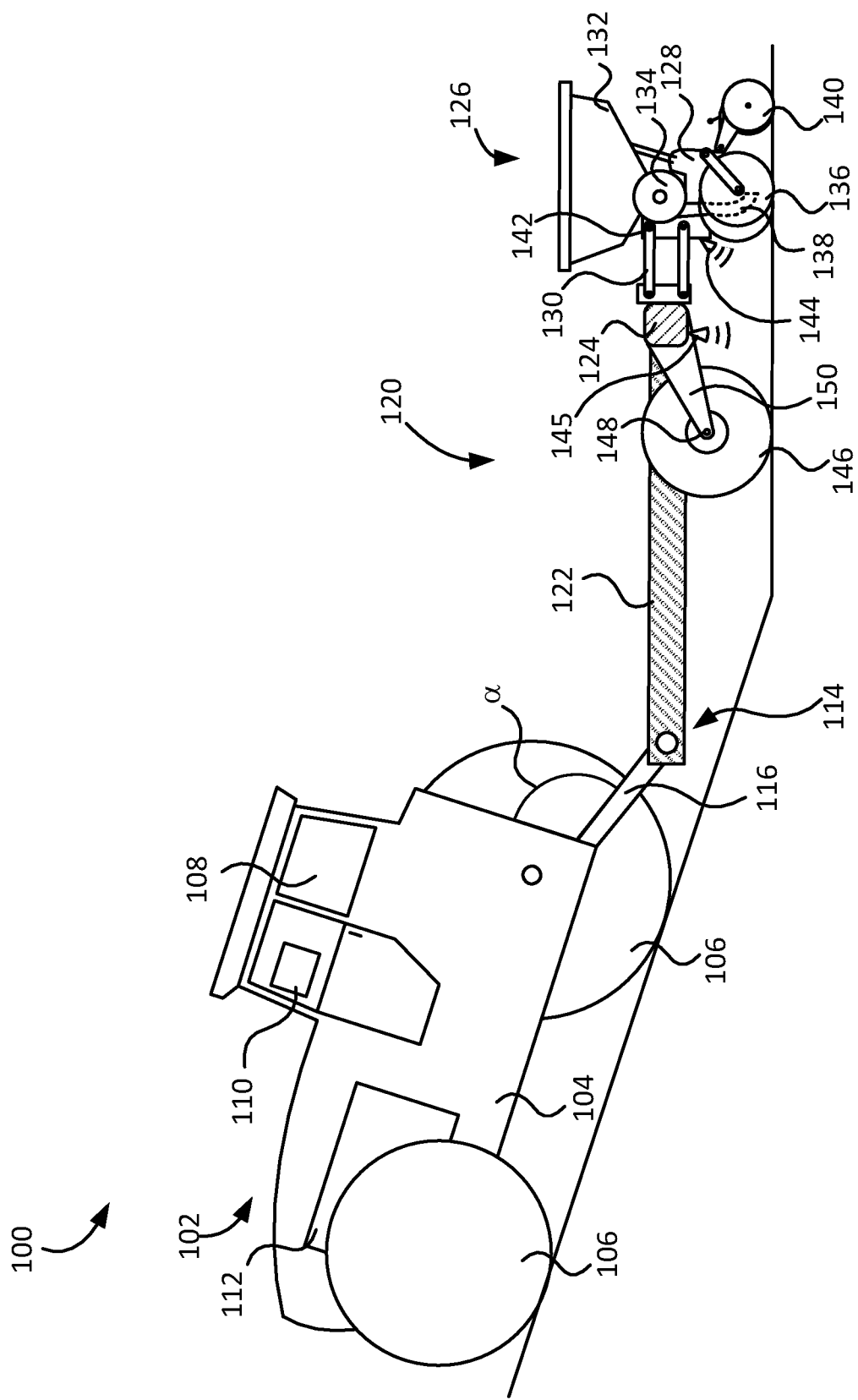

As shown in FIG. 4, the tractor 102 may continue up the slope, and the lift system 114 may lower relative to the tractor 102 (corresponding to a larger angle α) to maintain the same orientation shown in FIGS. 1 through 3.

Figure 5:
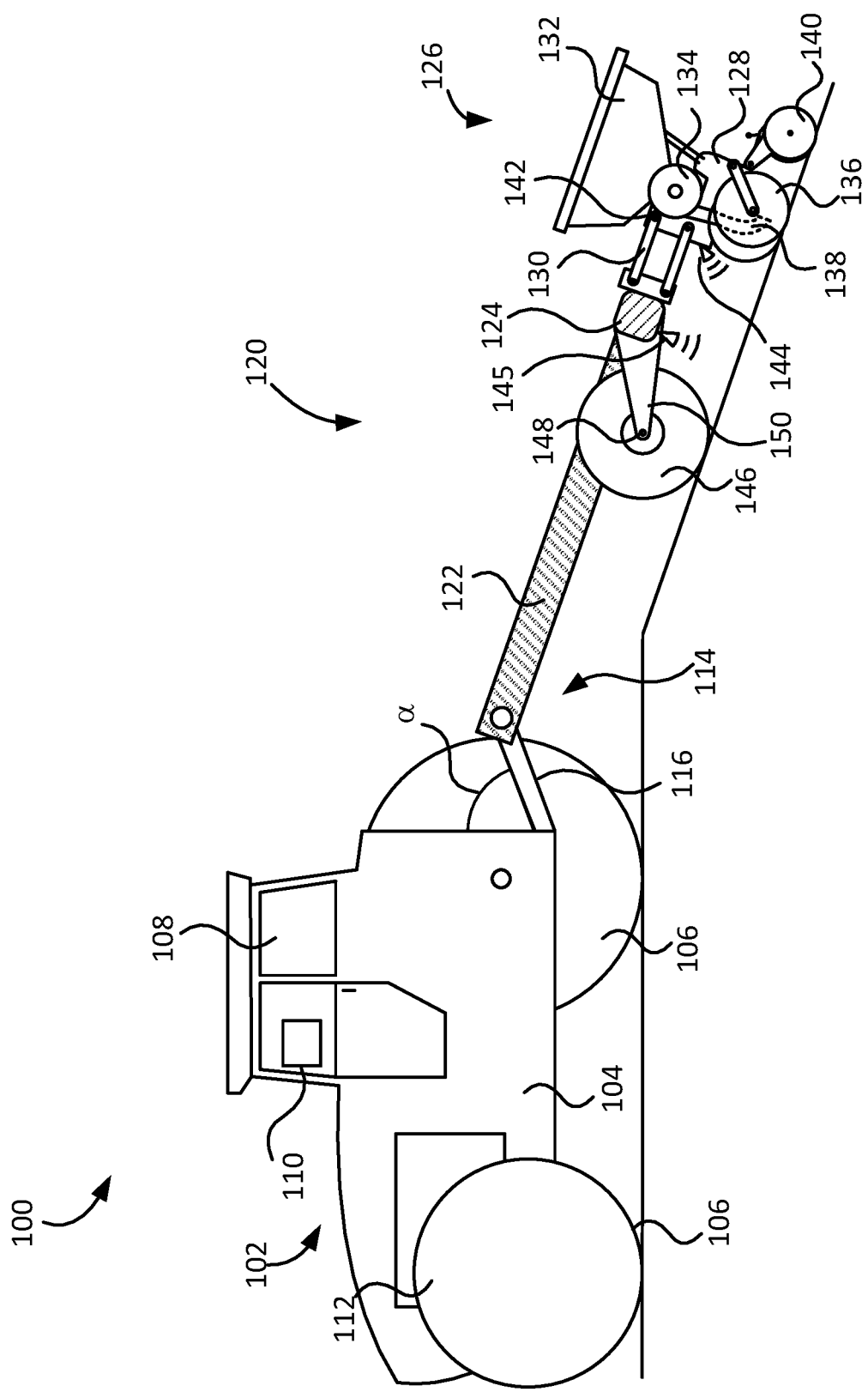

As shown in FIG. 5, the tractor 102 may travel on level ground as the implement 120 is still traveling up the slope, and the lift system 114 may raise relative to the tractor 102 (corresponding to a smaller angle α) to maintain the same relative orientation between the implement frame 122 and the ground.

In each of FIGS. 1 through 5, the parallel linkages 130 are shown in the same position (approximately parallel to the frame 122). However, the parallel linkages 130 of each row unit 126 may also adjust to move the row units 126, and may move independent of one another. Vertical movement of the lift system 114 provides additional range of motion to enable the implement 120 to keep the row units 126 engaged with the soil, whereas reliance on movement of the parallel linkages 130 alone would limit the range of terrain over which the row units 126 could be effectively used.

Furthermore, the frame 122 of the implement 120 may pivot relative to the lift system 114. Thus, the position of the toolbar 124 may vary based on the position of the lift system 114 (e.g., the position of the tow hitch 116) and the contours of the ground. Vertical movement of the lift system 114 while the ground is flat causes tilting of the frame 122 relative to the ground. The position of the row units 126 relative to the ground depends on the position of the toolbar 124 (which in turn depends on the position and angle of the frame 122) and the position of the parallel linkage 130.

The height of each row unit 126 may be adjusted independently of the other row units 126 by adjusting the individual parallel linkages 130. In certain field terrain, each parallel linkage 130 may be adjusted within its operating range such that each row unit 126 interacts with the ground at a preselected position. Movement of the toolbar 124 based on the lift system 114 can increase the effective range of height of the row units 126 relative to the tractor 102. Thus, the implement 120 in combination with the tractor 102 as described may effectively be used to work fields having contours that are steeper than contours that can be effectively worked by conventional implements.

Figure 6:
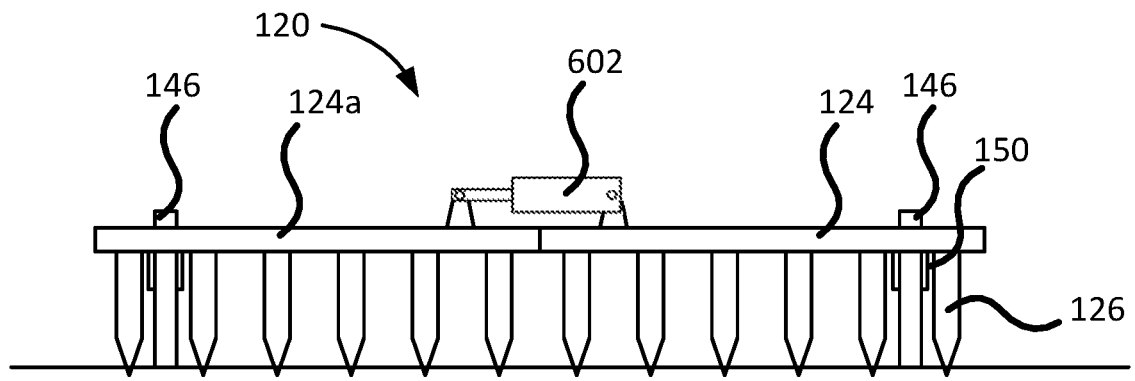
FIG. 6 is a simplified rear view the implement shown in FIG. 1 on level ground.

FIG. 6 shows a simplified rear view of the implement 120 traveling over level ground. The lift system 114 (FIGS. 1 through 5) is adjusted such that the row units 126 may each engage the ground by appropriate adjustment of the parallel linkages 130. The parallel linkages 130 may adjust the depth at which individual row units 126 operate (e.g., plant seeds) in the ground.

Figure 7:
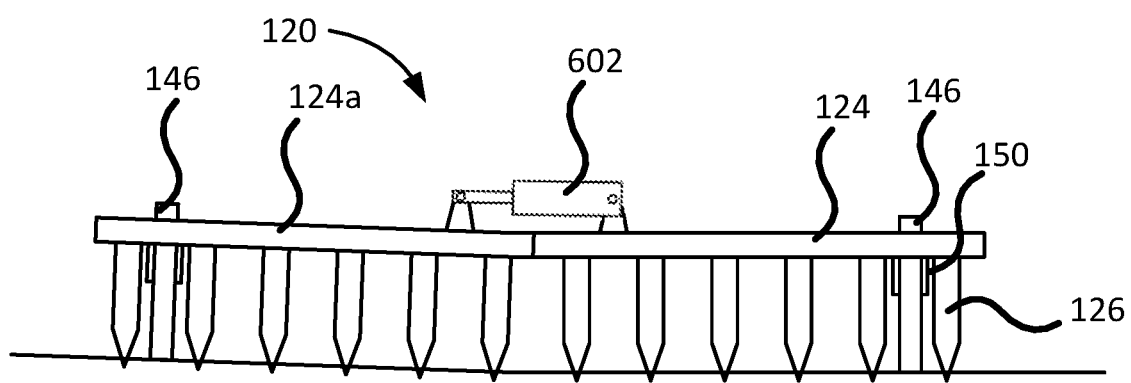
FIG. 7 is a simplified rear view the implement shown in FIG. 1 on sloped ground.

FIG. 7 shows a simplified rear view of the implement 120 traveling over sloped ground, and illustrates how the implement 120 may adjust to different terrain. In FIG. 7, the ground at the left-hand side is sloped upward from the center, and the ground at the right-hand side is level. The toolbar 124 may be coupled to one or more adjustable wing sections 124a that can flex (i.e., move relative to the toolbar 124) to match different terrain, such as described in U.S. Pat. No. 10,582,654, "Implement Load Balancing System," issued Mar. 10, 2020. One or more actuators 602 may raise or lower the wing section 124a such that the row units 126 carried by that wing section 124a remain at a preselected position with respect to the ground. That is, in addition to the parallel linkage 130, which is adjustable on a per-row-unit basis, the actuator 602 and the lift system 114 may adjust the height and/or angle of the toolbar 124 or wing section(s) 124a, based at least in part on the sensed positions of the row units 126. Adjustment of the actuator 602 provides an additional range of adjustment beyond that provided by the parallel linkages 130 and the lift system 114. That is, the row units 126 may be adjusted by moving the toolbar 124 upward or downward (i.e., by moving the lift system 114), by moving the actuator 602, and by moving the row units 126 with respect to the toolbar 124 (i.e., by rotating the parallel linkage 130). Thus, each row unit 126 may exhibit a wider total range of motion than an implement 120 having only the parallel linkage 130 to adjust the height of the row unit 126 with respect to the tractor 102.

Typically, there may be multiple row units 126 on each of the toolbar 124 and the wing section(s) 124a. Thus, movement of the actuator 602 typically changes the position of the multiple row units 126. The control system 110 may calculate an appropriate position of the actuator 602, the lift system 114, and the parallel linkages 130 so that the row units 126 on the toolbar and the wing section(s) 124a can each be at a preselected depth. That is, the control system 110 may select an actuator position and a hitch position such that the row units 126 can each be adjusted with the parallel linkages 130 to be at a preselected depth. The actuator 502 may enable a wider range of operating conditions (e.g., maximum field slope variation) than conventional wing control systems and may enable the control system 110 to respond more quickly to changing field terrain.

Though the implement 120 is described herein as a planter, other types of implements may have other types of row units, such as tillage implements (e.g., disc harrows, chisel plows, field cultivators, etc.) and seeding tools (e.g., grain drills, disc drills, etc.).

Figure 8:
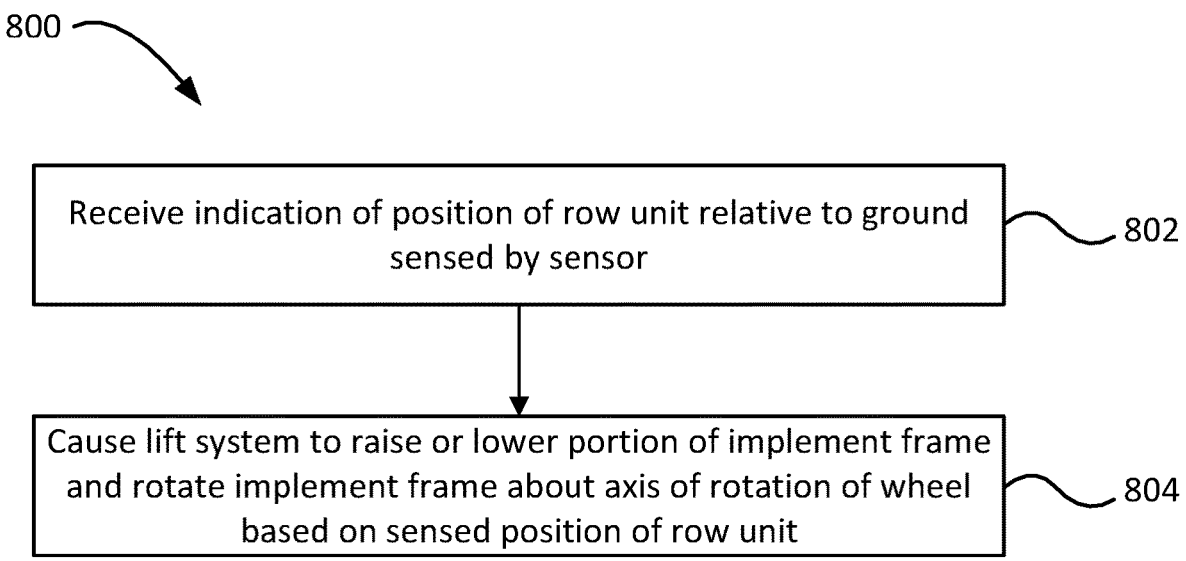
FIG. 8 is a simplified flow chart illustrating a method of operating a tractor and implement.

FIG. 8 is a simplified flow chart illustrating a computer-implemented method 800 of using the implement 120 to work an agricultural field. In block 802, an indication is received of a position of at least one row unit relative to ground sensed by a sensor. For example, a signal from the sensor may be received by a controller. In block 804, a lift system raises or lowers a portion of an implement frame and rotates the implement frame about an axis of rotation a wheel based at least in part on a sensed position of the at least one row unit. For example, a signal may be sent to a control component associated with the tractor 102.

Figure 9:
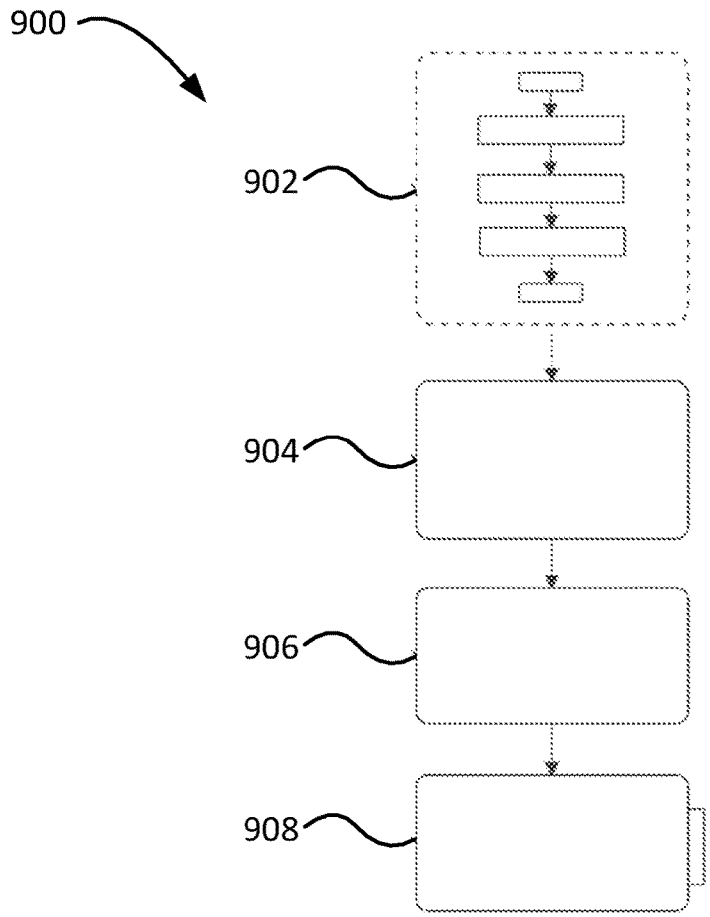
FIG. 9 illustrates an example computer-readable storage medium comprising processor-executable instructions configured to embody one or more of the methods of operating a tractor and implement, such as the method illustrated in FIG. 8.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 9, wherein an implementation 900 includes a computer-readable storage medium 902 (e.g., a flash drive, CD-R, DVD-R, application-specific integrated circuit (ASIC), field-programmable gate array (FPGA), a platter of a hard disk drive, etc.), on which is computer-readable data 904. This computer-readable data 904 in turn includes a set of processor-executable instructions 906 configured to operate according to one or more of the principles set forth herein. In some embodiments, the processor-executable instructions 906 may be configured to cause a computer associated with the tractor 102 (FIG. 1) to perform operations 908 when executed via a processing unit, such as at least some of the example method 800 depicted in FIG. 8. In other embodiments, the processor-executable instructions 906 may be configured to control a system, such as at least some of the example system 100 depicted in FIG. 1. Many such computer-readable media may be devised by those of ordinary skill in the art that are configured to operate in accordance with one or more of the techniques presented herein.

Additional non limiting example embodiments of the disclosure are described below.

Embodiment 1: An agricultural system comprising an implement comprising an implement frame. The implement frame has an integrated elongate toolbar carrying at least one row unit, and at least one wheel coupled to the implement frame and defining an axis of rotation. A sensor is configured to sense a position of the at least one row unit relative to ground. A control system is configured to receive a signal related to the sensed position of the at least one row unit relative to the ground and cause a lift system to raise or lower a portion of the implement frame connected to the lift system to rotate the implement frame about the axis of rotation of the at least one wheel based at least in part on the signal.

Embodiment 2: The system of Embodiment 1, wherein vertical movement of the lift system causes rotation of the implement frame.

Embodiment 3: The system of Embodiment 1 or Embodiment 2, wherein the lift system comprises a lifting hitch secured to a tractor.

Embodiment 4: The system of Embodiment 1 or Embodiment 2, wherein the lift system comprises a pivoting or lateral adjustment configured to be secured to a fixed drawbar of a tractor.

Embodiment 5: The system of any one of Embodiment 1 through Embodiment 4, wherein the at least one row unit is coupled to the toolbar by a parallel linkage.

Embodiment 6: The system of Embodiment 5, wherein the sensor comprises a rotary sensor configured to measure an angle of an element of the parallel linkage.

Embodiment 7: The system of any one of Embodiment 1 through Embodiment 6, wherein the sensor comprises an ultrasonic, lidar, or radar sensor.

Embodiment 8: The system of any one of Embodiment 1 through Embodiment 7, wherein the sensor is carried by the implement.

Embodiment 9: The system of any one of Embodiment 1 through Embodiment 8, wherein the control system is carried by a tractor pulling the implement.

Embodiment 10: The system of any one of Embodiment 1 through Embodiment 9, further comprising at least one adjustable wing section rotatably coupled to the toolbar.

Embodiment 11: The system of Embodiment 10, further comprising an actuator configured to raise or lower the at least one wing section relative to the toolbar.

Embodiment 12: The system of Embodiment 11, wherein the control system is configured to control the actuator based at least in part on the sensed position of the at least one row unit.

Embodiment 13: The system of any one of Embodiment 1 through Embodiment 12, wherein a weight of the implement frame is supported by the at least one wheel.

Embodiment 14: A control system for an implement having at least one wheel coupled to an implement frame, the implement frame having an integrated elongate toolbar carrying at least one row unit. The control system comprises a sensor configured to sense a position of the at least one row unit relative to ground, and a controller configured to receive a signal from the sensor indicating the position of the at least one row unit relative to the ground and cause a lifting system to raise or lower a portion of the implement frame to rotate the implement frame about an axis of rotation of the at least one wheel based on the sensed position of the at least one row unit.

Embodiment 15: A computer-implemented method for operating a tractor and an implement having a frame coupled to the tractor, the frame supported by at least one wheel and having an integrated elongate toolbar carrying at least one row unit. The method comprises receiving an indication of a position of the at least one row unit relative to ground sensed by a sensor, and causing a lift system to raise or lower a portion of the implement frame relative to the tractor to rotate the implement frame about an axis of rotation of the at least one wheel based at least in part on the indication of the position of the at least one row unit.

Embodiment 16: The method of Embodiment 15, wherein receiving an indication of a position of the at least one row unit relative to ground sensed by a sensor comprises receiving a signal from the sensor.

The structures and methods shown and described herein may be used in conjunction with those shown in U.S. Provisional Patent Application 60/007,114, "Agricultural Implements Having Row Unit Position Sensors and at Least One Adjustable Wheel, and Related Control Systems and Methods," filed Apr. 8, 2020; U.S. Provisional Patent Application 63/007,130, "Systems Comprising Agricultural Implements Connected to Lifting Hitches and Related Control Systems and Methods," filed Apr. 8, 2020; and U.S. Provisional Patent Application 63/007,182, "Agricultural Implements Having Row Unit Position Sensors and Actuators Configured to Rotate Toolbars, and Related Control Systems and Methods," filed Apr. 8, 2020. All references cited herein are incorporated herein in their entireties. If there is a conflict between definitions herein and in an incorporated reference, the definition herein shall control.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various agricultural machine types and configurations.

What is claimed is:

1. An agricultural system, comprising:
an implement comprising an implement frame, the implement frame having an integrated elongate toolbar carrying at least one row unit;
at least one wheel coupled to the implement frame forward of the toolbar and defining an axis of rotation;
a sensor configured to sense a position of the at least one row unit relative to a ground surface; and
a control system configured to receive a signal related to the sensed position of the at least one row unit relative to the ground surface and cause a lift system to raise or lower a front portion of the implement frame connected to the lift system to rotate the implement frame about the axis of rotation of the at least one wheel and raise or lower the toolbar based at least in part on the signal;
wherein the at least one wheel is coupled to the implement frame in a manner such that raising or lowering the front portion of the frame rotates the implement frame about the axis of rotation.

2. The system of claim 1, wherein vertical movement of the lift system causes rotation of the implement frame.

3. The system of claim 1, wherein the lift system comprises a lifting hitch secured to a tractor.

4. The system of claim 1, wherein the lift system comprises a pivoting or lateral adjustment configured to be secured to a fixed drawbar of a tractor.

5. The system of claim 1, wherein the at least one row unit is coupled to the toolbar by a parallel linkage.

6. The system of claim 5, wherein the sensor comprises a rotary sensor configured to measure an angle of an element of the parallel linkage.

7. The system of claim 1, wherein the sensor comprises an ultrasonic, lidar, or radar sensor.

8. The system of claim 1, wherein the sensor is carried by the implement.

9. The system of claim 1, wherein the control system is carried by a tractor pulling the implement.

10. The system of claim 1, further comprising at least one adjustable wing section rotatably coupled to the toolbar.

11. The system of claim 10, further comprising an actuator configured to raise or lower the at least one wing section relative to the toolbar.

12. The system of claim 11, wherein the control system is configured to control the actuator based at least in part on the sensed position of the at least one row unit.

13. The system of claim 1, wherein a weight of the implement frame is supported by the at least one wheel.

14. A control system for an agricultural system having an implement and at least one wheel, the implement having an implement frame coupled to the at least one wheel at a position forward of an integrated elongate toolbar carrying at least one row unit, the at least one wheel defining an axis of rotation, the control system comprising:
a sensor configured to sense a position of the at least one row unit relative to a ground surface; and
a controller configured to receive a signal from the sensor indicating the position of the at least one row unit relative to the ground surface and cause a lifting system to raise or lower a portion of the implement frame to rotate the implement frame about the axis of rotation and raise or lower the toolbar based on the sensed position of the at least one row unit.

15. An agricultural system, comprising:
an implement comprising an implement frame, the implement frame having an integrated elongate toolbar carrying at least one row unit;
at least one wheel coupled to the implement frame forward of the toolbar and defining an axis of rotation;
a sensor configured to sense a position of the at least one row unit relative to a ground surface; and
a control system connected to a lift system, the control system being configured to receive a signal related to the sensed position of the at least one row unit relative to the ground surface and vertically adjust the lift system based at least in part on the signal;
wherein the at least one wheel is coupled to the implement frame in a manner such that vertically adjusting the front portion of the frame rotates the implement frame about the axis of rotation; and
wherein the at least one wheel is coupled to the implement frame in a manner such that upward movement of the front portion of the frame rotates the implement frame about the axis of rotation to cause downward movement of the toolbar.

16. The system of claim 15, wherein the lift system comprises a lifting hitch secured to a tractor.

17. The system of claim 15, wherein the sensor is carried by the implement.

18. The system of claim 15, wherein the control system is carried by a tractor pulling the implement.

19. The system of claim 15, wherein the at least one row unit is coupled to the toolbar by a parallel linkage.

20. The system of claim 19, wherein the sensor comprises a rotary sensor configured to measure an angle of an element of the parallel linkage.

* * * * *